(12) United States Patent
Suzuki (10) Patent No.: US 8,713,553 B2
(45) Date of Patent: Apr. 29, 2014

(54) DISK ARRAY APPARATUS AND FIRMWARE UPDATE METHOD THEREFOR

(75) Inventor: Ryo Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/248,482

(22) Filed: Sep. 29, 2011

(65) Prior Publication Data

US 2012/0084508 A1 Apr. 5, 2012

(30) Foreign Application Priority Data

Oct. 4, 2010 (JP) .................. 2010-225110

(51) Int. Cl.
G06F 9/44 (2006.01)
G06F 9/445 (2006.01)

(52) U.S. Cl.
USPC .......................................... 717/168; 717/174

(58) Field of Classification Search
USPC ................... 717/168–178, 120–121
See application file for complete search history.

(56) References Cited

U.S. PATENT DOCUMENTS

| | | | |
|---|---|---|---|
| 6,675,258 B1 * | 1/2004 | Bramhall et al. | 711/114 |
| 6,836,859 B2 * | 12/2004 | Berg et al. | 714/36 |
| 7,284,236 B2 * | 10/2007 | Zhou et al. | 717/121 |
| 2007/0188507 A1 * | 8/2007 | Mannen et al. | 345/532 |
| 2008/0184020 A1 * | 7/2008 | Gee et al. | 713/2 |
| 2012/0084508 A1 * | 4/2012 | Suzuki | 711/114 |

FOREIGN PATENT DOCUMENTS

| | | |
|---|---|---|
| JP | H09305395 A | 11/1997 |
| JP | 2001027954 A | 1/2001 |
| JP | 2002007157 A | 1/2002 |
| JP | 2004199120 A | 7/2004 |
| JP | 2007219571 A | 8/2007 |
| JP | 2007220092 A | 8/2007 |
| JP | 2007293519 A | 11/2007 |

OTHER PUBLICATIONS

Japanese Office Action for JP2008-225110 mailed on Aug. 27, 2012.

* cited by examiner

Primary Examiner — Don Wong
Assistant Examiner — Marina Lee
(74) Attorney, Agent, or Firm — Sughrue Mion, PLLC (57) ABSTRACT

This invention proposes a disk array apparatus capable of improving its reliability. This disk array apparatus includes a first controller, and a second controller configured redundantly with the first controller, wherein the first controller and the second controller respectively include a storage area for storing firmware and are both in an operating state. When update processing of an update portion as a portion to be updated in the firmware of the first controller is unsuccessful, the first controller confirms whether update processing of an update portion of the firmware of the second controller is also unsuccessful, and, in a case where the update processing of the update portion of the firmware of the second controller has ended normally, rewrites firmware data of the update portion of the first controller with the firmware data of the update portion of the second controller.

6 Claims, 4 Drawing Sheets

DISK ARRAY APPARATUS AND FIRMWARE UPDATE METHOD THEREFOR

This application is based upon and claims the benefit of priority from Japanese patent application No. 2010-225110, filed on Oct. 4, 2010, the disclosure of which is incorporated herein in its entirety by reference.

BACKGROUND

The present invention relates to a disk array apparatus and its firmware update method for updating firmware of controllers and the like.

Conventionally, the update processing of firmware of controllers in a disk array apparatus is performed upon correcting bugs or reinforcing functions, and the update frequency is high. Nevertheless, with the update processing of firmware of controllers in a conventional disk array apparatus, if the writing of the firmware is unsuccessful due to the occurrence of a failure during the firmware update or other reasons, there is a problem in that the infrastructure of the controller needs to be replaced.

As a device for resolving the foregoing problem, for example, there is a device of a system which redundantly comprises mediums to which firmware is written, periodically determines the normality of the firmware stored in the respective mediums, and, if a failure occurs in the running firmware, switches its operation to the firmware stored in the other medium and which is free from failure. As a device of this type of system, for example, an information processing apparatus of Patent Publication JP-A-2004-199120 is disclosed.

Specifically, the information processing apparatus of Patent Publication JP-A-2004-199120 comprises operational firmware stored in a rewritable memory, a CPU that runs on such operational firmware, a nonvolatile memory which stores corrective firmware as firmware that is one generation older than the operational firmware or which has operational experience, n-number of modules to which a monitoring device is connected via a system bus, and a system monitoring device.

With the information processing apparatus of Patent Publication JP-A-2004-199120, when the monitoring device detects a failure in the operational firmware that is currently running, the monitoring device notifies the system monitoring device that a failure has been detected. Subsequently, the system monitoring device requests the switching of firmware to the monitoring device of all n-number of modules. In addition, with the information processing apparatus of Patent Publication JP-A-2004-199120, the monitoring device of all n-number of modules switches the operational firmware to the corrective firmware, and the system monitoring device thereafter reboots all n-number of modules normally.

Nevertheless, with the information processing apparatus of Patent Publication JP-A-2004-199120, since both operational firmware and corrective firmware must be provided, two mediums are required for storing the firmware, and there are problems in that the cost of parts will increase, and extra mounting space is required on the hardware mounting surface.

SUMMARY

An exemplary object of the invention is to propose a disk array apparatus and its firmware update method capable of improving the reliability.

An exemplary aspect of the present invention proposes a disk array apparatus comprising a first controller which executes predetermined processing in response to a request or data sent from a host apparatus, and a second controller configured redundantly with the first controller, wherein the first controller and the second controller respectively comprise a storage area for storing firmware, wherein the first controller and the second controller are both in an operating state, and wherein, when update processing of an update portion as a portion to be updated in the firmware of the first controller is unsuccessful, the first controller confirms whether update processing of an update portion of the firmware of the second controller is also unsuccessful, and, in a case where the update processing of the update portion of the firmware of the second controller has ended normally, acquires firmware data of the update portion of the second controller, and rewrites firmware data of the update portion of the first controller with the firmware data of the update portion of the second controller.

Moreover, an exemplary aspect of the present invention additionally proposes a firmware update method of a disk array apparatus including a first controller which executes predetermined processing in response to a request or data sent from a host apparatus, and a second controller configured redundantly with the first controller, wherein the first controller and the second controller respectively comprise a storage area for storing firmware, and the first controller and the second controller are both in an operating state, comprising a first step of the first controller confirming, when update processing of an update portion as a portion to be updated in the firmware of the first controller is unsuccessful, whether update processing of an update portion of the firmware of the second controller was also unsuccessful, and a second step of the first controller acquiring, in a case where the update processing of the update portion of the firmware of the second controller has ended normally, firmware data of the update portion of the second controller, and rewriting firmware data of the update portion of the first controller with the firmware data of the update portion of the second controller.

In addition, an exemplary aspect of the present invention further proposes a disk array apparatus comprising a controller which executes predetermined processing in response to a request or data sent from a host apparatus, wherein the controller comprises a storage area for storing firmware, and wherein the controller executes update processing of an update portion as a portion to be updated in the firmware based on firmware update data sent from a maintenance terminal, and, in a case where the update processing of the update portion of the firmware is unsuccessful, reacquires the firmware update data from the maintenance terminal, and re-executes the update processing of the update portion of the firmware.

Accordingly, upon updating the firmware of controllers of the disk array apparatus, there is no need to redundantly comprise firmware data, and recovery can be automatically performed when the firmware update is unsuccessful.

EXEMPLARY EMBODIMENT

An embodiment of the present invention is now explained in detail with reference to the appended drawings. Note that the present invention is not limited by the following embodiments.
(Configuration)

Figure 1:
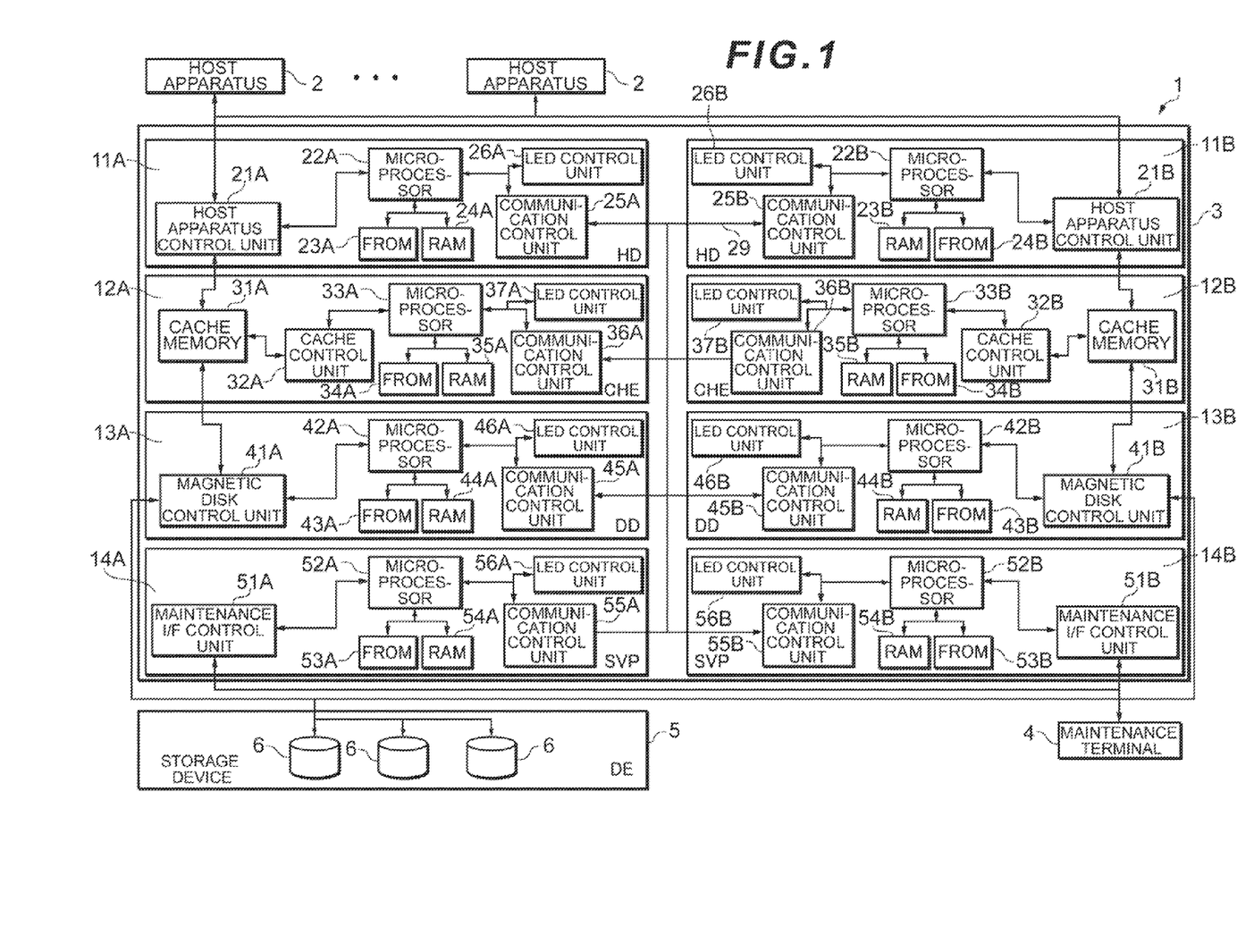
FIG. 1 is an example of a block diagram showing the hardware configuration of the storage system.

FIG. 1 shows an example of the hardware configuration of the storage system 1 according to this embodiment. The storage system 1 is configured by comprising a plurality of host apparatuses 2, a disk array apparatus 3, a maintenance terminal 4 and a storage device 5. The storage device 5 is configured by comprising a plurality of magnetic disk devices 6.

The host apparatus 2 is, for example, a computer device comprising information processing resources such as a CPU (Central Processing Unit) and memory, an information input unit, and an information output unit. The host apparatus 2 is connected to the disk array apparatus 3 via a predetermined network. As the predetermined network, for example, a LAN (Local Area Network), a SAN (Storage Area Network), internet, a dedicated line, a public line or the like may be used as needed.

The host apparatus 2 sends, for example, a write request to the disk array apparatus 3, and writes corresponding data into a magnetic disk device 6 of the storage device 5. Moreover, the host apparatus 2 sends, for example, a read request to the disk array apparatus 3, and reads corresponding data from the magnetic disk device 6 of the storage device 5.

The disk array apparatus 3 is configured by comprising, for example, a first host director (HD) 11A and a second host director 11B as controllers for performing control in response to the various requests sent from the host apparatus 2, a first cache module (CHE) 12A and a second cache module 12B as controllers for controlling the cache memories 31A, 31B (described later), a first disk director (DD) 13A and a second disk director 13B as controllers for controlling the magnetic disk device 6 of the storage device 5, and a first service processor (SVP) 14A and a second service processor 14B as controllers for providing a maintenance service function based on the request sent from the maintenance terminal 4.

The first host director 11A and the second host director 11B are configured redundantly. The first cache module 12A and the second cache module 12B are configured redundantly. The first disk director 13A and the second disk director 13B are configured redundantly. The first service processor 14A and the second service processor 14B are configured redundantly.

Note that, in the ensuing explanation, the first and second host directors 11A, 11B, the first and second cache modules 12A, 12B, the first and second disk director 13B and the first and second service processors 14A, 14B are sometimes collectively referred to as the "respective controllers". The respective controllers are respectively a pair of redundant configurations, but they may be configured redundantly as a plurality of pairs, and can be easily expanded.

The first host director 11A is configured by comprising a host apparatus control unit 21A, a microprocessor 22A, an FROM (Flash ROM) (storage area) 23A, a RAM (Random Access Memory) 24A, a communication control unit 25A and an LED control unit 26A. The first host director 11A is connected to the first cache module 12A via a prescribed cable.

The host apparatus control unit 21A sends, to the microprocessor 22A, the various requests sent from the host apparatus 2 and the response sent from the first cache module 12A. The host apparatus control unit 21A sends, to the first cache module 12A or the host apparatus 2, the data that was sent from the host apparatus 2. The host apparatus control unit 21A sends, to the host apparatus 2, the response to the various requests sent from the host apparatus 2, and sends, to the first cache module 12A, a command based on the various requests sent from the host apparatus 2.

The microprocessor 22A interprets the various requests sent from the host apparatus control unit 21A and the commands sent from the communication control unit 25A, controls the host apparatus control unit 21A, the FROM 23A, the RAM 24A, the communication control unit 25A and the LED control unit 26A, and sends commands and responses.

The FROM 23A is, for example, a nonvolatile storage medium. For example, one firmware 27 (described later) is installed and stored in the FROM 23A. The firmware 27 is updated by firmware update data 28 (described later). The RAM 24A is, for example, a volatile storage medium. In the RAM 24A, the firmware 27 (described later) stored in the FROM 23A, various control programs and various application software are expanded so that they can be executed by the microprocessor 22A.

The communication control unit 25A is communicably connected to the respective communication control units 25B, 36A, 36B, 45A, 45B, 55A, 55B via an internal bus 29, and sends and receives commands, responses, data and the like to and from the respective communication control units. The LED control unit 26A shows the operation condition and the like of the first host director 11A by flashing the LED.

The second host director 11B is configured the same as the first host director 11A. Note that the respective components of the second host director 11B are given a suffix "B" in substitute for the suffix "A" to the same reference numeral for those which are the same as the components of the first host director 11A.

The first cache module 12A is configured by comprising a cache memory 31A, a cache control unit 32A, a microprocessor 33A, an FROM 34A, a RAM 35A, a communication control unit 36A and an LED control unit 37A. The first cache module 12A is connected to the first disk director 13A via a prescribed cable.

The cache memory 31A is, for example, a volatile storage medium. The cache memory 31A temporarily stores the data sent from the first cache module 12A and the first disk director 13A.

The cache control unit 32A sends, to the microprocessor 33A, the commands sent from the first host director 11A and the response sent from the first disk director 13A. The cache control unit 32A sends, to the first disk director 13A or the first host director 11A, the data stored in the cache memory 31A at a predetermined timing. The cache control unit 32A sends, to the first host director 11A, the response to the command sent from the first host director 11A, and sends, to the first disk director 13A, a command based on the command sent from the first host director 11A.

The microprocessor 33A interprets the commands sent from the cache control unit 32A and the communication control unit 36A, controls the cache control unit 32A, the FROM 34A, the RAM 35A, the communication control unit 36A and the LED control unit 37A, and sends commands and responses.

The FROM 34A is, for example a nonvolatile storage medium. For example, one firmware 27 (described later) is installed and stored in the FROM 34A. The firmware 27 is updated by firmware update data 28 (described later). The RAM 35A is, for example, a volatile storage medium. In the RAM 35A, the firmware 27 (described later) stored in the FROM 34A, various control programs and various application software are expanded so that they can be executed by the microprocessor 33A.

The communication control unit 36A is communicably connected to the respective communication control units 25A, 25B, 36B, 45A, 45B, 55A, 55B via an internal bus 29, and sends and receives commands, responses, data and the like to and from the respective communication control units. The LED control unit 37A shows the operation condition and the like of the first cache module 12A by flashing the LED.

The second cache module 12B is configured the same as the first cache module 12A. Note that the respective components of the second cache module 12B are given a suffix "B" in substitute for the suffix "A" to the same reference numeral for those which are the same as the components of the first cache module 12A.

The first disk director 13A is configured by comprising a magnetic disk control unit 41A, a microprocessor 42A, an FROM 43A, a RAM 44A, a communication control unit 45A and an LED control unit 46A. The first disk director 13A is connected to the storage device 5 via a prescribed cable.

The magnetic disk control unit 41A sends, to the microprocessor 42A, the commands sent from the first cache module 12A and the response sent from the storage device 5. The host apparatus control unit 42A sends, to the first cache module 12A, the data sent from the storage device 5. The magnetic disk control unit 41A sends, to the first cache module 12A, the response to the command sent from the first cache module 12A, and the magnetic disk control unit 41A sends, to the storage device 5, a command based on the command sent from the first cache module 12A.

The microprocessor 42A interprets the commands sent from the first cache module 12A and the communication control unit 45A, controls the magnetic disk control unit 41A, the microprocessor 42A, the FROM 43A, the RAM 44A, the communication control unit 45A and the LED control unit 46A, and sends commands and responses.

The FROM 43A is, for example, a nonvolatile storage medium. For example, one firmware 27 (described later) is installed and stored in the FROM 43A. The firmware 27 is updated by firmware update data 28 (described later). The RAM 44A is, for example, a volatile storage medium. In the RAM 44A, the firmware 27 (described later) stored in the FROM 43A, various control programs and various application software are expanded so that they can be executed by the microprocessor 42A.

The communication control unit 45A is communicably connected to the respective communication control units 25A, 25B, 36A, 36B, 45B, 55A, 55B via an internal bus 29, and sends and receives commands, responses, data and the like to and from the respective communication control units. The LED control unit 46A shows the operation condition and the like of the first disk director 13A by flashing the LED.

The second disk director 13B is configured the same as the first disk director 13A. Note that the respective components of the second disk director 13B are given a suffix "B" in substitute for the suffix "A" to the same reference numeral for those which are the same as the components of the first disk director 13A.

The first service processor 14A is configured by comprising a maintenance I/F control unit 51A, a microprocessor 52A, an FROM 53A, a RAM 54A, a communication control unit 55A and an LED control unit 56A. The first service processor 14A is connected to the maintenance terminal 4 via a prescribed cable.

The maintenance I/F control unit 51A sends, to the microprocessor 52A, the various requests sent from the maintenance terminal 4. The maintenance I/F control unit 51A sends, to the first maintenance terminal 4, the response to the various requests sent from the maintenance terminal 4.

The microprocessor 52A interprets the various requests sent from the maintenance terminal 4 and the commands sent from the communication control unit 55A, controls the maintenance I/F control unit 51A, the microprocessor 52A, the FROM 53A, the RAM 54A, the communication control unit 55A and the LED control unit 56A, and sends commands and responses.

The FROM 53A is, for example, a nonvolatile storage medium. For example, one firmware 27 (described later) is installed and stored in the FROM 53A. The firmware 27 is updated by firmware update data 28 (described later). The RAM 54A is, for example, a volatile storage medium. In the RAM 54A, the firmware 27 (described later) stored in the FROM 53A, various control programs and various application software are expanded so that they can be executed by the microprocessor 52A.

The communication control unit 55A is communicably connected to the respective communication control units 25A, 25B, 36A, 36B, 45A, 45B, 55B via an internal bus 29, and sends and receives commands, responses, data and the like to and from the respective communication control units. The LED control unit 56A shows the operation condition and the like of the first service processor 14A by flashing the LED.

The second service processor 14B is configured the same as the first service processor 14A. Note that the respective components of the second service processor 14B are given a suffix "B" in substitute for the suffix "A" to the same reference numeral for those which are the same as the components of the first service processor 14A.

The maintenance terminal 4 is a terminal device for maintaining or managing the disk array apparatus 3. The maintenance terminal 4 sends, based on various requests from the host apparatus 2 or the operations by the maintenance worker, for example, a update request of the firmware 27 (described later) and the firmware update data 28 (described later), and additionally performs various types of maintenance and management processing.

The magnetic disk device 6 of the storage device 5 is, for example, a magnetic disk device including ATA (Advanced Technology Attachment) hard disk drives, SATA (Serial-ATA) hard disk drives, SCSI (Small Computer System Interface) hard disk drives, SAS (Serial Attached SCSI) hard disk drives, or fibre channel hard disk drives arranged in an array.

The magnetic disk device 6 is set, for example, as a disk device that is operated according to the RAID format, and a plurality of logical volumes can be set on a physical storage area provided by one or more disk devices. In the foregoing case, data is stored in a logical volume in appearance.

Figure 2:
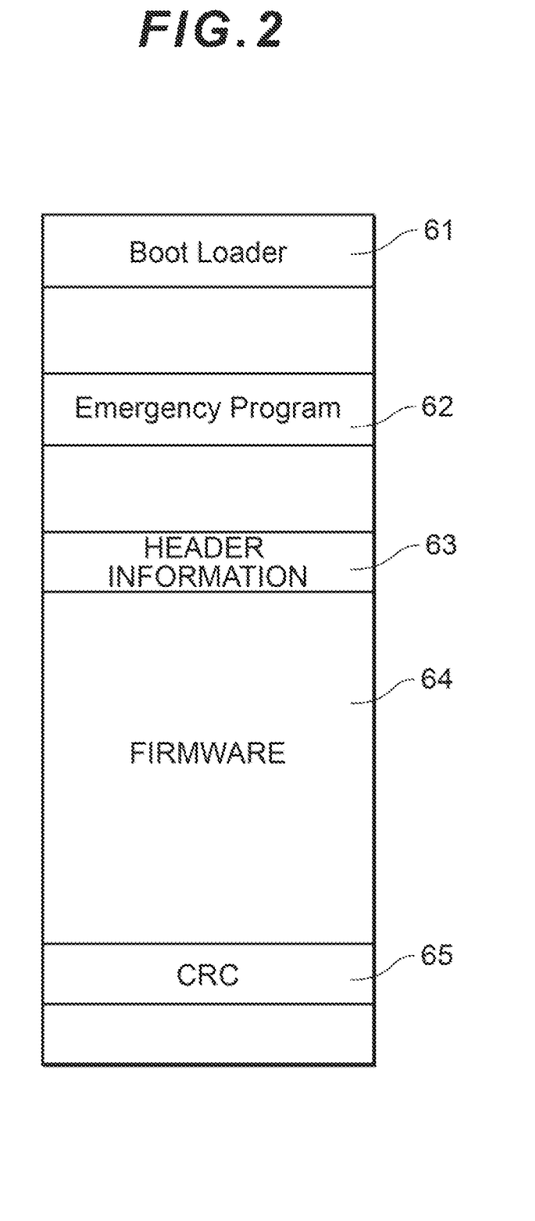
FIG. 2 is an example of a conceptual diagram explaining the firmware.

FIG. 2 is a diagram showing an example of the firmware 27. The firmware 27 is configured by including a boot loader 61, an emergency program 62, header information 63, firmware data 64 and CRC (Cyclic Redundancy Check) 65.

The boot loader 61 is a program for determining whether the firmware data 64 is broken (whether there is an error in the data of the firmware data 64). The emergency program 62 is a program that is executed when the firmware data 64 is broken. The emergency program 62 is a small program for executing communication control by the internal bus 29, writing control of the firmware data 64, and LED flashing control. The header information 63 is configured by including firmware revision information or CRC information of the model code or firmware data 64. The firmware data 64 is a program for causing the respective controllers of the disk controller 3 to execute the intended operation, and is configured by including a microcode. The CRC 65 is information for checking whether the firmware data 64 is broken.

Here, each FROM of the respective controllers of the disk controller 3 is configured from an updatable part where data can be updated, and a non-updatable part where data cannot be updated. The boot loader 61 and the emergency program 62 are stored in the non-updatable part. The header information 63, the firmware data 64 and the CRC 65 are stored in the updatable part.

The firmware update data 28 is data for updating the firmware data 64 stored in the updatable part of each FROM upon performing the update processing of the firmware 27.

(Firmware Update Processing)

Figure 3:
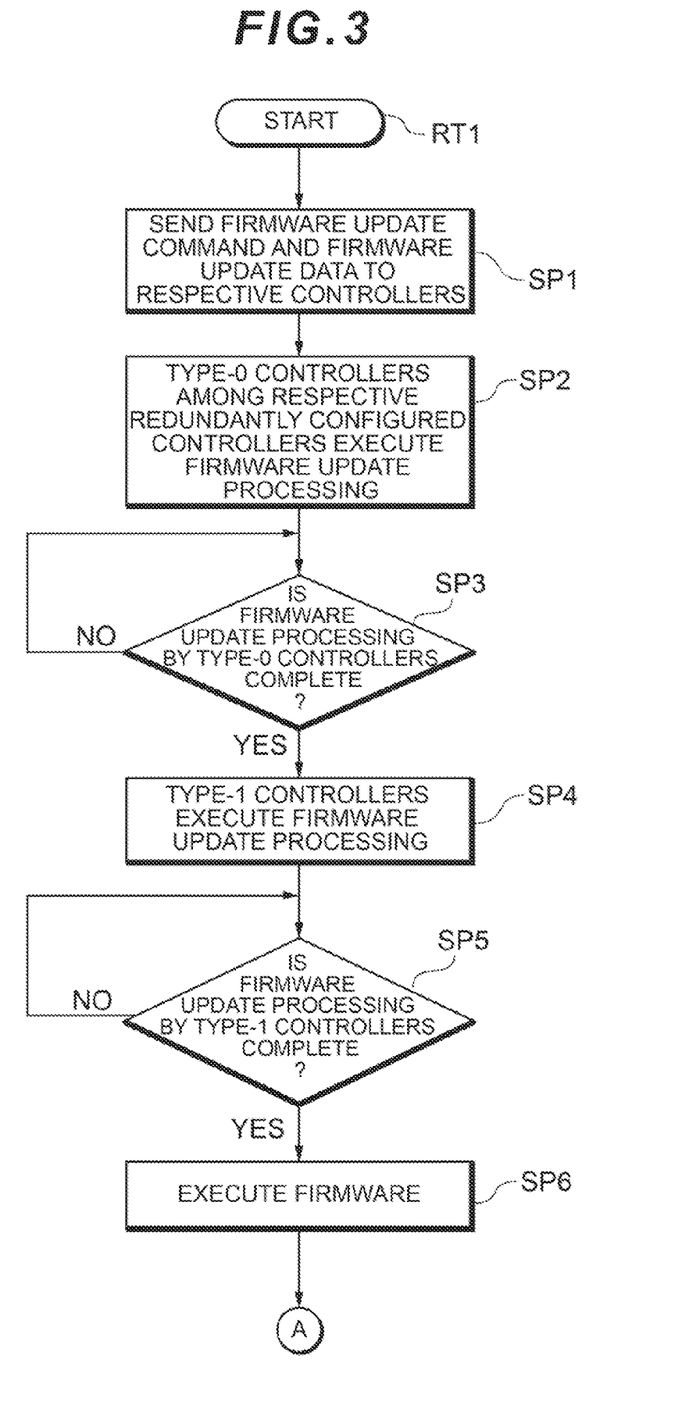
FIG. 3 is an example of a flowchart showing the firmware update processing routine.
Figure 4:
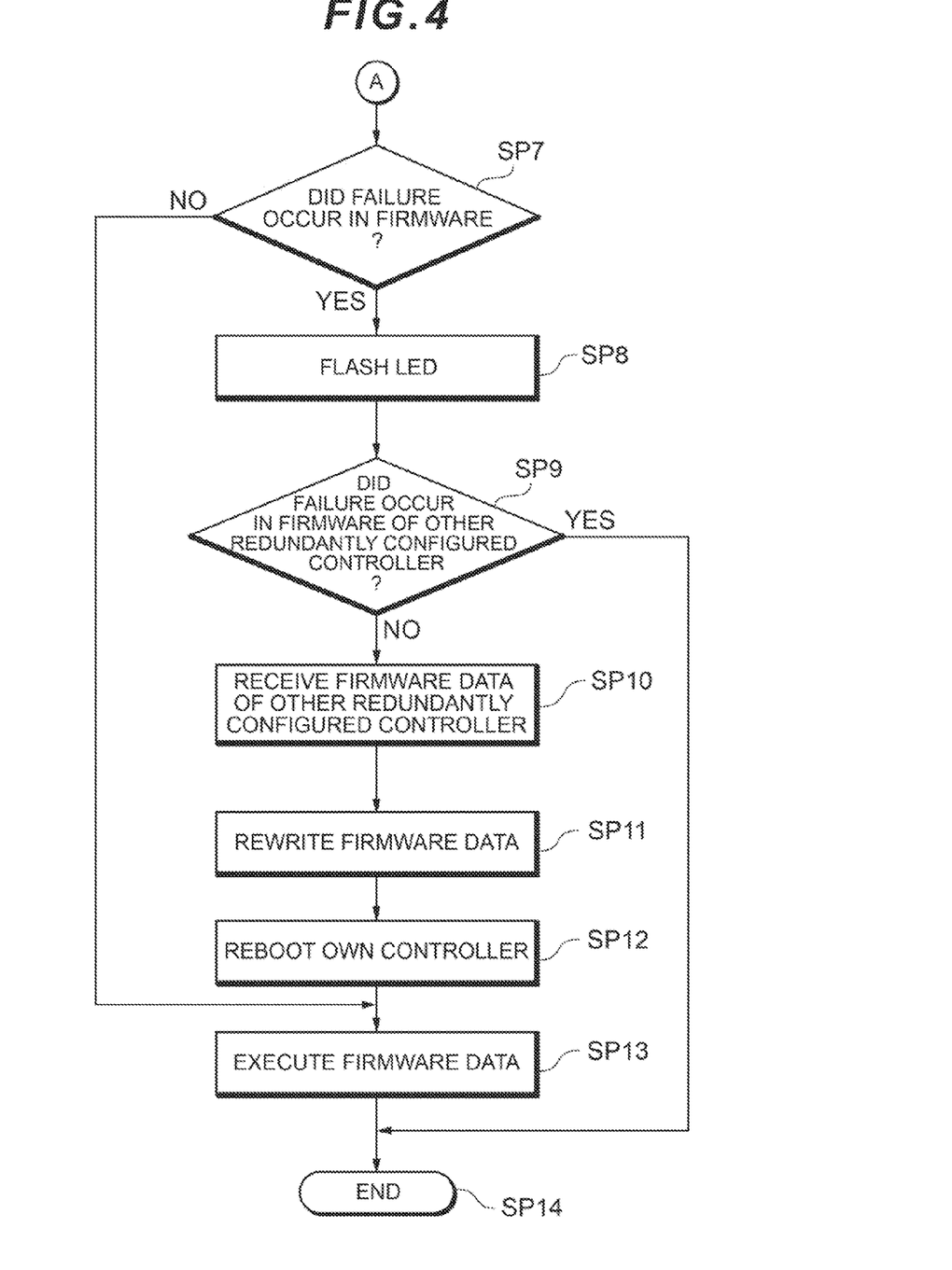
FIG. 4 is an example of a flowchart showing the firmware update processing routine.

The operation of the storage system 1 of this embodiment is now explained in detail. FIG. 3 and FIG. 4 are flowcharts showing the firmware update processing of the storage system 1 of this embodiment.

When the disk array apparatus 3 receives an update request of the firmware 27 from the maintenance terminal 4, it executes the update processing one at a time for each type in the redundant configuration of a pair. For example, in the case of performing the update processing of the first and second host directors 11A, 11B, the update processing of the second host director 11B is executed after the update processing of the first host director 11A is executed.

Specifically, when the first service processor 14A or the second service processor 14B receives the update request of the firmware 27 of the firmware update data 28 from the maintenance terminal 4, it starts the firmware update processing routine RT1 shows in FIG. 3 and FIG. 4, and sends the firmware update data 28 to the respective controllers that should update the firmware 27 (step SP1).

Subsequently, the respective controllers that should update the firmware 27 determine whether its own controller is a type-0 controller (first controller) or a type-1 controller (second controller) of the controllers configured redundantly, and, if it is a type-0 controller, executes the update processing of the firmware 27 (step SP2).

In the foregoing case, for example, the first host director 11A, the first cache module 12A, the first disk director 13A and the first service processor 14A are set as the type-0 controllers, and the second host director 11B, the second cache module 12B, the second disk director 13B and the second service processor 14B are set as the type-1 controllers.

Subsequently, the type-0 controller waits for the update processing of the firmware 27 to end in a standby mode (step SP3). When the update processing of the firmware 27 is ended, the type-0 controller notifies the corresponding type-1 controller that the update processing of the firmware 27 has ended.

Eventually, when the update processing of the firmware 27 of the type-0 controller is ended (step SP3: YES), the type-1 controller executes the update processing of the firmware 27 (step SP4). Note that, as a result of the type-1 controller receiving a notification to the effect that the update processing of the firmware 27 has ended from the corresponding type-0 controller, it recognizes that the update processing of the firmware 27 of the type-0 controller is complete.

Subsequently, the type-1 controller waits for the update processing of the firmware 27 to end in a standby mode (step SP5). When the update processing of the firmware 27 is ended, the type-1 controller notifies the corresponding type-0 controller that the update processing of the firmware 27 has ended.

Here, if the update processing of the firmware 27 of the type-0 controller is being executed, the type-1 controller does not execute the update processing of the firmware 27 of the type-0 controller. Accordingly, it is possible to effectively prevent the firmware data 64 of the firmware 27 of both the type-0 controller and the type-1 controller from simultaneously breaking as a result of the update processing of the firmware 27 being discontinued due to the occurrence of an unexpected power-supply disconnection during the update processing of the firmware 27.

When the update processing of the firmware 27 of the type-1 controller eventually ends (step SP5: YES), the respective controllers execute the firmware 27 (step SP6). Subsequently, the respective controllers check whether a failure has occurred in the firmware 27 (step SP7).

Specifically, the respective controllers execute the boot loader 61 of the firmware 27, and check whether the CRC information of the header information 63 and the CRC 65 coincide. If the CRC information of the header information 63 and the CRC 65 coincide, the respective controllers determine that a failure has not occurred in the firmware 27, and, if the CRC information of the header information 63 and the CRC 65 do not coincide, the respective controllers determine that a failure has occurred in the firmware 27.

If a failure has not occurred in the firmware 27 (step SP7: NO), the respective controllers proceed to step SP13, execute the firmware data 64 (step SP13), and thereafter end the firmware update processing routine RT1 shown in FIG. 3 and FIG. 4 (step SP14).

Meanwhile, if a failure has occurred in the firmware 27 (step SP7: YES), the respective controllers execute the emergency program 62, and execute the LED flashing control based on a predetermined LED flashing pattern in the corresponding LED control unit in order to show that the firmware data 64 is broken (step SP8). The respective controllers in which a failure occurred in the firmware 27 are thereby able to easily notify to the outside that the firmware data 64 is broken.

Moreover, the respective controllers in which a failure occurred in the firmware 27 write a code showing that "the firmware data 64 is broken" in the register value showing its own status. Note that the first service processor 14A or the second service processor 14B can recognize the operating status of the respective controllers by confirming the register value of the respective controllers. Moreover, as a result of the first service processor 14A or the second service processor 14B being able to recognize the operating status of the respective controllers, the maintenance terminal 4 is also able to recognize the operating status of the respective controllers.

Subsequently, the respective controllers in which a failure occurred in the firmware 27 check whether a failure has occurred in the firmware 27 of the other controller of the redundant configuration (step SP9). If a failure has occurred in the firmware 27 of the other controller of the redundant configuration (step SP9: YES), the respective controllers in which a failure occurred in the firmware 27 thereafter end the firmware update processing routine RT1 shown in FIG. 3 and FIG. 4 (step SP14).

If a failure has not occurred in the firmware 27 of the other controller of the redundant configuration (step SP9: NO); that is, if the firmware 27 of the other controller has been updated normally, the respective controllers in which a failure occurred in the firmware 27 receives the firmware data 64 of the other controller of the redundant configuration (step SP10).

Specifically, the respective controllers in which a failure occurred in the firmware 27 send, to the other controller of the redundant configuration, a confirmation request regarding whether the firmware 27 has been updated normally. The other controller of the redundant configuration confirms whether the firmware 27 has been updated normally. If the firmware 27 has not been updated normally, the other controller of the redundant configuration sends a message to such effect to the controller that sent the confirmation request, and, if the firmware 27 has been updated normally, sends a message to such effect and the normally updated firmware data 64 to the controller that sent the confirmation request.

Subsequently, the respective controllers in which a failure occurred in the firmware 27 rewrite the firmware data 64 stored in its own firmware 27 with the firmware 27 received from the other controller of the redundant configuration (step SP11). Subsequently, the respective controllers in which a failure occurred in the firmware 27 reboots its own controller (step SP12), executes the firmware data 64 (step SP13), and thereafter ends the firmware update processing routine RT1 shown in FIG. 3 and FIG. 4 (step SP14).

(Operation and Effect)

As described above, with the storage system 1, the respective controllers in which a failure occurred in the firmware 27 check whether a failure has occurred in the firmware 27 of the other controller of the redundant configuration, and, if the firmware 27 of the other controller has been updated normally, rewrite the firmware data 64 stored in its own firmware 27 with the firmware 27 received from the other controller of the redundant configuration.

Accordingly, even when the update of the firmware 27 is unsuccessful, the update failure of the firmware 27 can be automatically recovered without having to perform any special operation such as replacing the controller or having to adopt a special hardware configuration. Consequently, it is possible to reduce the labor hours of recovery workers and reduce the hardware costs.

Other Example 1

Other examples of the present invention are now explained in detail with reference to the drawings.

With the other example 1, explained is a case where a failure has also occurred in the firmware 27 of the other controller of the redundant configuration (step SP9: YES), and described is the processing after the firmware update processing routine RT1 is ended (step SP14).

In the foregoing case, the respective controllers in which a failure occurred in the firmware 27 flash the LED control unit corresponding to a special LED flashing pattern that shows "the firmware data 64 is broken and automatic recovery is not possible". Note that the respective controllers in which a failure occurred in the firmware 27 writes a code that shows "the firmware data 64 is broken and automatic recovery is not possible" in the register value showing its own status.

The first service processor 14A or the second service processor 14B can recognize the operating status of the respective controllers by confirming the register value of the respective controllers via the internal bus 29. When the first service processor 14A or the second service processor 14B recognizes a controller written with a code that shows "the firmware data 64 is broken and automatic recovery is not possible" among the respective controllers, it sends a message to such effect to the maintenance terminal 4, and displays, on the display screen of the maintenance terminal 4, a message to the effect that it is necessary to recover the corresponding firmware 27 in the maintenance operation. Accordingly, during the maintenance operation by the maintenance terminal 4, it is possible to easily cause a maintenance worker of the maintenance terminal 4 that the update processing of the firmware 27 was unsuccessful and that a recovery operation is required.

Note that the respective controllers in which a failure occurred in the firmware 27 can also notify a message showing that "the firmware data 64 is broken and automatic recovery is not possible" to the corresponding to the service processor 14.

When the recovery operation of updating the firmware 27 is performed by the maintenance worker, the maintenance terminal 4 resends the firmware re-update request and the firmware update data 28 to the controller to recover the firmware 27 via the first service processor 14A or the second service processor 14B.

Subsequently, when the respective controllers in which a failure occurred in the firmware 27 receive the firmware re-update command and the firmware update data 28 from the first service processor 14A or the second service processor 14B, it executes the update processing of the firmware 27.

As described above, with the storage system 1, if a failure has also occurred in the firmware 27 of the other controller of the redundant configuration, the first service processor 14A or the second service processor 14B sends a message to the effect that the firmware data 64 is broken and automatic recovery is not possible to the maintenance terminal 4, receives the firmware update data 28 from the maintenance terminal 4 once again, and re-executes the update processing of the firmware 27.

Accordingly, even if the update processing of the firmware 27 is also unsuccessful in the other controller of the redundant configuration, the recovery processing of the firmware 27 can be performed without having to force the maintenance worker to perform complicated operations in the maintenance terminal 4.

Other Example 2

In this embodiment, although a case was explained where the respective controllers are respectively configured redundantly as a pair, the present invention is not limited thereto, and, for example, it is also possible to configure one of the respective controllers in a compact disk array apparatus. Here, when a failure occurs in the firmware 27, the service processor sends a message to the effect that the firmware data 64 is broken and automatic recovery is not possible to the maintenance terminal 4, receives the firmware update data 28 from the maintenance terminal 4 once again, and re-executes the update processing of the firmware 27.

An exemplary advantage according to the present invention, it is possible to realize a disk array apparatus and its firmware update method capable of improving the reliability.

The whole or part of the exemplary embodiments disclosed above can be described as, but not limited to, the following supplementary notes.

(Supplementary Note 1) A disk array apparatus including a first controller which executes predetermined processing in response to a request or data sent from a host apparatus, and a second controller configured redundantly with the first controller, wherein the first controller and the second controller respectively comprise a storage area for storing firmware, wherein the first controller and the second controller are both in an operating state, and wherein, when update processing of an update portion as a portion to be updated in the firmware of the first controller is unsuccessful, the first controller confirms whether update processing of an update portion of the firmware of the second controller was also unsuccessful, and, if the update processing of the update portion of the firmware of the second controller has ended normally, acquires firmware data of the update portion of the second controller, and rewrites firmware data of the update portion of the first controller with the firmware data of the update portion of the second controller.

(Supplementary Note 2) The disk array apparatus according to Supplementary Note 1, wherein the second controller starts the update processing of the update portion of the firmware of the second controller when the update processing of the update portion of the firmware of the first controller is ended.

(Supplementary Note 3) The disk array apparatus according to Supplementary Note 1, wherein the first controller and the second controller execute the update processing of the update portion of the firmware of the first controller and the second controller based on firmware update data sent from a maintenance terminal, and, wherein, if the update processing of the update portion of the firmware of the second controller was also unsuccessful, the first controller reacquires the firmware update data from the maintenance terminal, and re-executes the update processing of the update portion of the firmware of the first controller.

(Supplementary Note 4) The disk array apparatus according to Supplementary Note 1, wherein, when the update processing of the update portion of the firmware of the first controller is unsuccessful, the first controller specifies the failure of the update processing to the outside.

(Supplementary Note 5) The disk array apparatus according to Supplementary Note 1, wherein the first controller and the second controller respectively store one firmware in the storage area.

(Supplementary Note 6) A firmware update method of a disk array apparatus including a first controller which executes predetermined processing in response to a request or data sent from a host apparatus, and a second controller configured redundantly with the first controller, wherein the first controller and the second controller respectively comprise a storage area for storing firmware, and the first controller and the second controller are both in an operating state, comprising a first step of the first controller confirming, when update processing of an update portion as a portion to be updated in the firmware of the first controller is unsuccessful, whether update processing of an update portion of the firmware of the second controller was also unsuccessful, and a second step of the first controller acquiring, if the update processing of the update portion of the firmware of the second controller has ended normally, firmware data of the update portion of the second controller, and rewriting firmware data of the update portion of the first controller with the firmware data of the update portion of the second controller.

(Supplementary Note 7) A disk array apparatus including a controller which executes predetermined processing in response to a request or data sent from a host apparatus, wherein the controller comprises a storage area for storing firmware, and wherein the controller executes update processing of an update portion as a portion to be updated in the firmware based on firmware update data sent from a maintenance terminal, and, if the update processing of the update portion of the firmware is unsuccessful, reacquires the firmware update data from the maintenance terminal, and re-executes the update processing of the update portion of the firmware.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A disk array apparatus, comprising:
a first controller which executes a predetermined processing in response to a request or data sent from a host apparatus; and
a second controller comprising firmware data configured redundantly with the first controller during update processing, wherein
the first controller and the second controller respectively have a storage area for storing a firmware,
the first controller and the second controller are both in an operating state,
wherein the first controller determines whether a first update processing of a first update portion to be updated in the firmware of the first controller is unsuccessful based on information in a header of the firmware of the first controller, and if the first controller determines that the first update processing is unsuccessful, executes an emergency program and LED flashing control to show that the firmware is broken and determines whether a second update processing of a second update portion of the firmware of the second controller is successful based on a message, which indicates a successful second update processing, sent by the second controller,
wherein the first controller acquires firmware data of the second update portion of the second controller and rewrites firmware data of the first update portion of the first controller with the firmware data of the second update portion of the second controller if the first controller determines that the second update processing of the second update portion of the firmware of the second controller is successful, and
wherein the first update processing and the second update processing are synchronized.

2. The disk array apparatus according to claim 1, wherein the second controller
starts the second update processing of the second update portion of the firmware of the second controller when the first update processing of the first update portion of the firmware of the first controller is ended.

3. The disk array apparatus according to claim 1, wherein the first controller and the second controller execute the first and second update processings of
the first and second update portions of the firmware of the first controller and the second controller based on firmware update data sent from a maintenance terminal, and
wherein when the second update processing of the second update portion of the firmware of the second controller is also unsuccessful, the first controller reacquires the firmware update data from the maintenance terminal and re-executes the first update processing of the first update portion of the firmware of the first controller.

4. The disk array apparatus according to claim 1, wherein, when the first update processing of the first update portion of the firmware of the first controller is unsuccessful, the first controller broadcasts a message indicating a failure of the first update processing.

5. The disk array apparatus according to claim 1, wherein the first controller and
the second controller respectively store one firmware in the storage area.

6. A firmware update method of a disk array apparatus which includes a first controller which executes a predetermined processing in response to a request or data sent from a host apparatus, and a second controller comprising firmware data configured redundantly with the first controller during update processing,
and in which the first controller and the second controller respectively have a storage area for storing a firmware, and the first controller and the second controller are both in an operating state,
the method comprising:
a first step in which the first controller determines whether a first update processing of a first update portion to be updated in the firmware of the first controller is unsuccessful based on information in a header of the firmware of the first controller, and if the first controller determines that the first update processing is unsuccessful, the first controller executes an emergency program and LED flashing control to show that the firmware is broken and determines whether a second update processing of a second update portion of the firmware of the second controller is successful based on a message, which indicates a successful second update processing, sent by the second controller; and
a second step in which the first controller acquires,
firmware data of the second update portion of the second controller
and rewrites firmware data of the first update portion of the first controller with the firmware data of the second update portion of the second controller if the first controller determines that the second update processing of the second update portion of the firmware of the second controller is successful,
wherein the first update processing and the second update processing are synchronized.

* * * * *